(12) United States Patent
Lovatt et al.

(10) Patent No.: US 6,194,852 B1
(45) Date of Patent: Feb. 27, 2001

(54) HIGH SPEED ELECTRIC MOTORS

(75) Inventors: Howard C Lovatt, Balmain; Peter Andrew Watterson, Denistone, both of (AU)

(73) Assignees: Commonwealth Scientific and Industrial Research Organisation, Campbell; University of Technology, Sydney, Broadway, both of (AU)

( * ) Notice: Subject to any disclaimer, the term of this patent is extended or adjusted under 35 U.S.C. 154(b) by 0 days.

(21) Appl. No.: 09/355,206

(22) PCT Filed: Jan. 23, 1998

(86) PCT No.: PCT/AU98/00035

§ 371 Date: Sep. 20, 1999

§ 102(e) Date: Sep. 20, 1999

(87) PCT Pub. No.: WO98/33260

PCT Pub. Date: Jul. 30, 1998

(30) Foreign Application Priority Data

Jan. 24, 1997 (AU) .................................................. PO 4782

(51) Int. Cl.[7] ................................. H02P 6/00; H02K 1/27
(52) U.S. Cl. ........................................... 318/254; 318/438
(58) Field of Search .................................... 318/138, 254, 318/438, 439, 700, 701, 720, 721, 722, 723; 310/156, 261, 262, 267

(56) References Cited

U.S. PATENT DOCUMENTS

| 4,638,200 | 1/1987 | LeCorre et al. . |
| 4,645,991 | 2/1987 | Ban et al. . |
| 4,651,069 | 3/1987 | Pellegrini . |
| 4,742,259 | 5/1988 | Scheafer et al. . |
| 5,606,232 | * 2/1997 | Harlan et al. ......................... 318/138 |
| 5,801,500 | * 9/1998 | Jensen et al. ......................... 318/254 |
| 5,864,191 | * 1/1999 | Nagate et al. .................... 310/261 X |
| 6,028,406 | * 2/2000 | Birk ...................................... 318/254 |

FOREIGN PATENT DOCUMENTS

| 1193650 | 9/1985 | (CA) . |
| 0134670 | 3/1985 | (EP) . |
| 0187478 | 7/1986 | (EP) . |
| 2052319 | 1/1981 | (GB) . |
| 3203541 | 9/1991 | (JP) . |

OTHER PUBLICATIONS

Stephen J. Chapman. "Electric Machinery Fundamentals", 3rd edition, McGraw–Hill, 1999. Chapter 6, "Synchronous Motors", pp 324–356.*

* cited by examiner

*Primary Examiner*—Bentsu Ro
(74) *Attorney, Agent, or Firm*—Fulbright & Jaworski, L.L.P.

(57) ABSTRACT

A high speed, brushless, DC motor has a rotor comprising a solid rare earth magnet core magnetized diametrically. The rotor includes a sleeve surrounding the magnet core to radially constrain the core during high speed rotation thereof. The sleeve extends axially in both directions from the core to form a hollow shaft for the rotor. The sleeve is formed of non-magnetic, low electrical conductivity material. Control circuitry is provided including an electronic inverter of a predetermined rating, the control circuitry including means to maintain substantially constant power through the range of motor speeds from a base speed to a maximum speed while maintaining a power factor close to 1.

7 Claims, 2 Drawing Sheets

HIGH SPEED ELECTRIC MOTORS

FIELD OF THE INVENTION

This invention relates to improvements in high speed electric motors and relates particularly to a high speed, brushless DC motor.

The invention will be described with particular reference to its application as a motor for a refrigerant, air or gas compressor, although it will be understood that the principles of the invention may be applied to motors used in other applications.

BACKGROUND OF THE INVENTION

The design and construction of a high speed, brushless DC motor for use as a compressor motor gives rise to a number of problems.

Such a motor must produce sufficient power to be effective as a compressor motor over a range of loads. To minimize the combined volume of the motor and compressor it is desirable to design a high speed, low torque motor of high efficiency.

High speed, brushless DC motors are known. In this connection. reference can be made to the text "Direct Current Machines", by Say and Taylor, 2nd Edition (Pitman International), and particularly sections 4.8, 5.10 and 11.4. Such motors are generally of a lower power output than that required for a refrigerant compressor motor. One form of such a motor uses a rare earth magnet (in particular, a grade of Neodymium-Iron-Boron [NdFeB]). This material, however, and other rare earth magnetic material, generally has a low tensile strength and is somewhat brittle. This has restricted its use to relatively lower powered high speed electric motors which are unsuitable for compressor motors.

In a refrigeration compressor application using the new refrigerants now available, such as R134A and other CFC refrigerants which are considered environmentally safe, it is not possible to use lubricants which are chemically incompatible with the refrigerant. This may exclude the use of conventional bearings in the compressor and hence the desire to be able to use non-contact bearings like magnetic or foil bearing. Such bearings would also, therefore, be used in the driving motor.

It is an object of the present invention to design a high speed electric motor which has a relatively high power output and a very high power to volume ratio.

It is also an object of the invention to design an electric motor able to be used for a refrigerant compressor, the rotor preferably being supported by oilless or non-contact bearings, such as magnetic bearings, foil bearings or the like but also able to be used with standard bearings in different applications.

It is also desirable to provide an electric motor for use as a compressor motor and the control of which is able to be effected by relatively low cost control circuitry.

It is also desirable to provide an electric motor the rotor of which incorporates a rare earth magnet in a structure which provides the necessary mechanical strength.

SUMMARY OF THE INVENTION

According to one aspect of the invention there is provided a high speed, brushless, DC motor having a rotor comprising a solid rare earth magnet core magnetized diametrically, said rotor including a sleeve surrounding said magnet core to radially constrain the core during high speed rotation thereof, the sleeve extending axially in both directions from the core to form a hollow shaft for the rotor, the sleeve being formed of non-magnetic, low electrical conductivity material.

Using the rotor sleeve to form a hollow motor shaft minimizes rotor weight and hence load on the bearings, whilst still providing the desired shaft stiffness and offering a cost effective construction method.

The motor of the invention uses the solid, rare earth magnet core on the rotor for maximum efficiency and lowest loss. The motor is preferably designed to run between operating speeds of 20,000 rpm and 50,000 rpm, which reduces the volume of the motor and compressor. Such high rotational speeds, however, place severe mechanical demands on the rotor which must withstand the high centrifugal forces generated. The rotor must also be sufficiently stiff that its resonant bending frequency exceeds the maximum rotating frequency. The rotor must also be as light as possible to minimize loading on the rotor bearings.

In a preferred embodiment of the invention for use with a refrigerant compressor, the rotor is supported on active magnetic bearings which locate the rotor both axially and radially. However, other forms of normal mechanical bearings or other types of contactless bearings may be used with the motor of the invention in other environments.

The rotor sleeve is preferably formed of a non-magnetic, high strength metal, such as Inconel, which has a relatively high Young's modulus and is able to provide the necessary bending stiffness required for the rotor shaft.

In the preferred form of the invention, the rare earth magnet core is maintained under compressive load (at rest) by pre-stressing the sleeve. Such pre-stressing may be generated by assembling the core and the sleeve with a substantial heat differential, such as by heating the sleeve. The outer diameter of the magnet core and the inner diameter of the sleeve are formed to provide an interference fit of a precise magnitude. When the sleeve is shrunk onto the core the relative dimensional change, both radially and axially, to effect an axial and radial compression of the magnet core. As the rotor rotates, the centrifugal forces generated are counteracted by the tension in the sleeve so that, at maximum rotational speed, minimal, if any, tension occurs in the magnet core. Thus, the compressive forces on the magnet core exerted by the sleeve ensure that the material of the core, which has a low tensile strength, does not crack, move, distort or the like as a result of the rotational forces on the rotor.

According to another aspect of the present invention, there is provided a high speed, brushless, DC motor having a rotor comprising a solid, rare earth magnet core surrounded by a constraining sleeve. and control circuitry including an electronic inverter of a predetermined rating, the control circuitry including means to maintain substantially constant power through the range of motor speeds from a base speed to a maximum speed while maintaining a power factor close to 1, by varying the advance angle of the supplied armature current relative to the back-emf thereby effecting flux-weakening throughout the constant power speed range. The currents and the power factors at the extremes of this range are designed to be equal, with the current lagging the voltage at the base speed and leading it at the maximum speed.

The optimal advance of the current angle at a given speed and torque will depend on the relative motor material cost and inverter cost (or value of increased output for a given inverter rating) as well as the relative thermal significance of iron and copper loss. If the current advance at base speed is set to equal, or approximately equal, the power factor angle at the base speed, the resulting power factor (and inverter utilization) exceeds that which can be achieved if no flux-weakening is used at the base speed.

This method of control minimizes the costs of the electronic control circuitry through use of lower cost components by optimizing the motor design around the ratio of magnet flux to armature flux. Thus, by designing the motor for flux-weakening at the base speed and through to the maximum speed, a lower inverter rating and iron loss is achieved, albeit at the expense of increased copper loss.

In one particular form of motor of this invention, at maximum power, the current advance must be around 15°–20° at the design base speed, i.e. approximately 32,000 rpm, and around 50°–55° at the design maximum speed, i.e. approximately 48,000 rpm. The motor is designed to have the required ratio of armature flux at peak power to magnet flux, and the use of a rotor which does not contain iron minimizes the inductance and minimizes the motor size for the required flux ratio.

In order that the invention is more readily understood, one particular embodiment thereof will now be described with reference to the accompanying drawings:

DESCRIPTION OF THE PREFERRED EMBODIMENT

Figure 1:
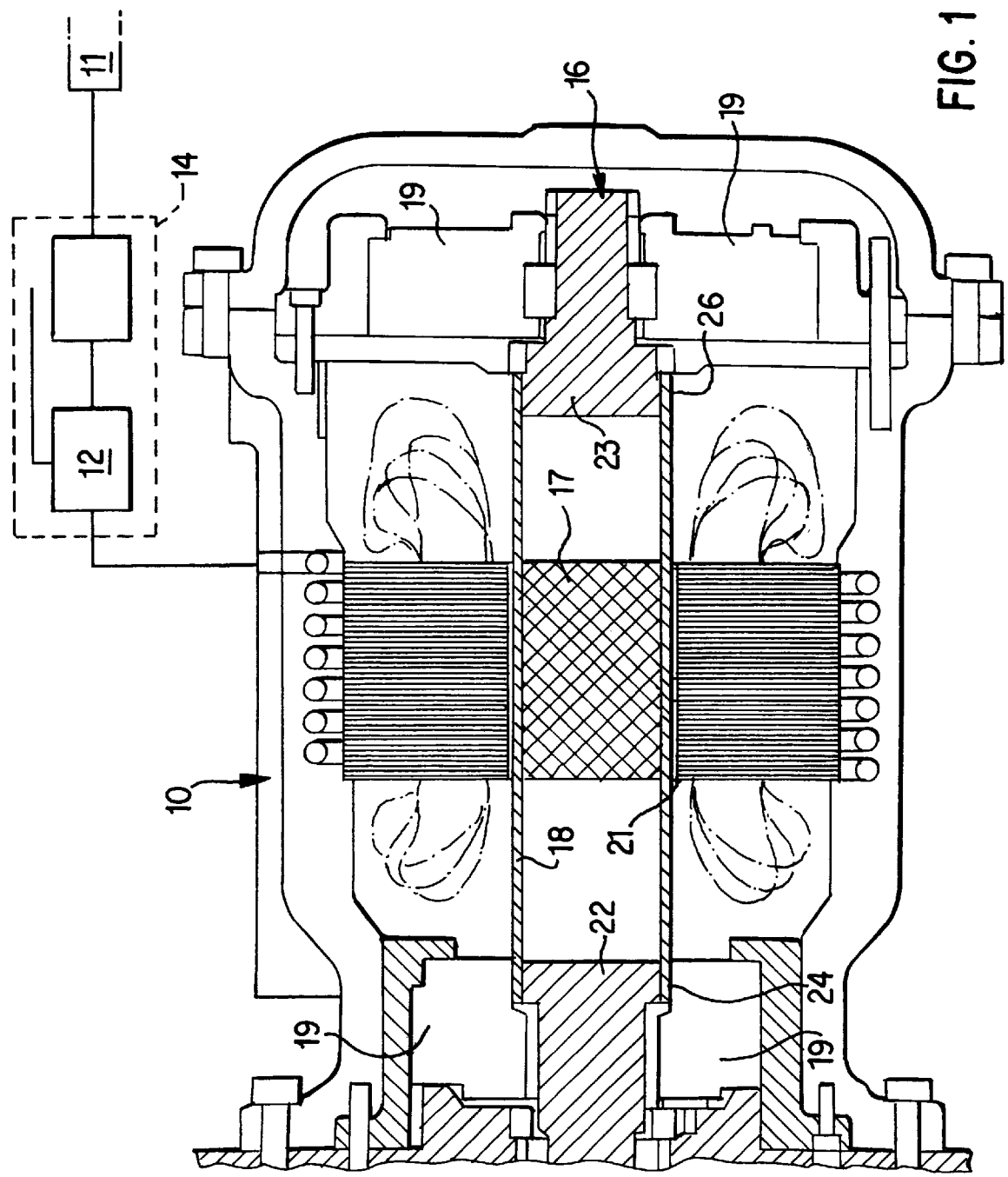
FIG. 1 comprises a part sectional schematic view of a motor in accordance with the present invention.

Referring to FIG. 1, the motor 10 illustrated is a high speed, brushless, slotted, DC motor particularly designed for driving a centrifugal compressor (not shown) for refrigerant. The motor 10 is designed to be as compact as possible in order to reduce as far as possible the overall size of the combined motor/compressor. However, it.is necessary that the motor 10 delivers sufficient power to the compressor commensurate with the available AC power supply 11 and the rating of the electronic inverter 12 in the control circuitry 14. In the embodiment illustrated, to minimize costs of the electronic inverter 12, its rating was restricted to 200A peak. This, then, determined that the output power would be between 70 and 85 kW with a three phase power supply nominal voltage of 415 Vrms.

The rotor 16 comprises a magnet core 17 of Neodymium-Iron-Boron (NdFeB) which is a sintered magnetic material with high magnetic energy density but low tensile strength. The magnet core 17 is contained within a sleeve 18 formed of INCONEL 718, which is a non-magnetic, low electrical conductivity metal alloy. The sleeve constrains the magnet core 17 against the forces generated during high speed rotation of the rotor. In the preferred form of the invention, the sleeve 18 is pre-stressed to maintain a compressive pressure on the magnet core when the rotor is stationary. Such pre-tensioning is effected by manufacturing the magnet core outer diameter and sleeve inner diameter of a dimension to effect an interference fit, and then expanding the sleeve by heating to enable the magnet core to be inserted therein. Cooling the sleeve 18 results in shrinkage, both radially and axially, thereby compressing the magnet radially and also applying some axial compression. Ideally, the pre-stressing of the sleeve 18 is such that, at the high rotational speeds of the rotor, no tension exists in the magnet core 17. In practice, some tension may be tolerated. The axial compression assists in lowering the tension in the magnet when rotating at high speed.

The sleeve 18, in addition to constraining the magnet core 17 is also extended axially in both directions therefrom to act as a hollow shaft for the rotor 16. The hollow shaft extends close to the magnetic bearings 19 which support the rotor 16, the hollow shaft providing the necessary bending stiffness to the rotor 16 to maintain the air gap 21 during motor operation.

Magnetic stub shafts 22 and 23 are engaged within the outer ends 24 and 26 of the sleeve 18. The stub shafts 22 and 23 provide the reactive shaft components required by the magnetic bearings 19.

In the design of the motor to achieve a minimum electronic inverter rating it is desirable to obtain constant power operation over a given speed range with as small as feasible a product of the peak phase current multiplied by the peak line-to-neutral voltage. Thus, not only should the power factor be near unity over the speed range, but also the current and voltage should each vary as little as possible. In the most common control method for permanent magnet motors, the flux from the stator current is at 90° to the flux from the magnet for minimum copper loss, and over a constant power range, the maximum current occurs at the lowest (or base) speed and the maximum voltage at the highest speed, with their product being greater than the product at any single speed. To improve on this the current is usually aligned with the magnet-back-emf (in the present case of isotropic inductance) for speeds up to the base speed when the voltage limit is reached, and then constant Dower is maintained up to the maximum speed by using flux-weakening. In flux-weakening, the magnet flux is countered by the flux from the stator current associated with an additional non-torque producing current component, which advances the total current vector ahead of the maximum torque alignment of 90°.

Figure 2:
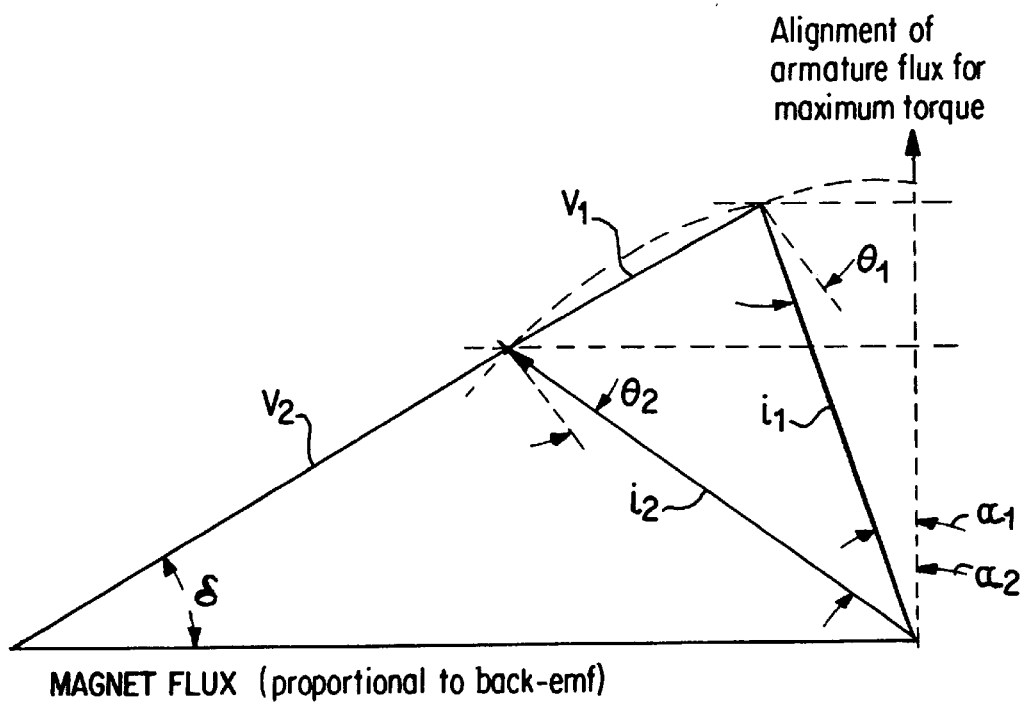
FIG. 2 is a phaser diagram of the various fluxes at the base speed and maximum speed.

In accordance with the present invention, firstly the currents and the power factors at the extreme speeds of the constant power range are designed to be equal, with the current lagging the voltage at the base speed and leading it at the maximum speed. This is shown in FIG. 2. Secondly, instead of only introducing flux-weakening progressively for speeds exceeding the base speed, significant flux-weakening is also used at the base speed. The amount of flux-weakening used is flexible, and in fact a power factor arbitrarily near 1 could be achieved if sufficiently high currents were allowable. As this introduces a cooling problem to the motor, a compromise provides that the current advance at the base speed is approximately equal the power factor angle then, as is the case in FIG. 2.

As shown in FIG. 2, if the ratio of base speed divided by maximum speed is s, then for constant power s is also the ratio of the component of the armature fluxes perpendicular to the magnet flux. It can be seen in FIG. 2 that for the current advance and power factor angle at base speed to be equal, they must both be equal.

$$\cos^{-1}\left(\sqrt{\frac{3+s}{4}}\right)$$

In FIG. 2:
δ=load angle
$\alpha_1$=current advance angle at base speed $\alpha_2$=current advance angle at maximum speed $\theta_1$=power factor angle at base speed $\theta_2$=power factor angle at maximum speed line $v_1$ represents the total flux (proportional to voltage) at base speed line $v_2$ represents the total flux (proportional to voltage) at maximum speed line $i_1$ represents the armature flux (proportional to current) at the base speed line $i_2$ represents the armature flux (proportional to current) at maximum speed.

In the embodiment illustrated, the constant power range required is from the base speed of approximately 32,000 rpm to approximately 48,000 rpm, which is a 1 to 1.5 range. For this speed range, the current advance angle $\alpha_1$ and power factor angle $\theta_1$ are equal at the base speed 32,000 rpm if both are 17° (to the nearest degree). This corresponds to a very good power factor pf=0.96. The current advance angle $\alpha_2$ at maximum speed, 48,000 rpm should be 50° The required load angle δ, i.e. voltage advance ahead of the magnet back-emf, is 34° and is identical at the base and maximum speeds. The current advance implies an increase in current of just 4% over the smallest it could have been to provide the torque at base speed, for this motor assuming no flux-weakening at base speed. With a greater current a slightly higher power factor (and output power) could have been achieved, but at the expense of a larger or hotter motor.

Since the power factor, current and output power have been made equal at the extremes of the constant power region, the voltages v must also be equal. However, for intermediate speeds the power factor increases, passing through 1, as the power factor angle changes from positive to negative. If constant current is maintained along with constant output power, then the voltage v must be slightly dropped at these intermediate speeds. Alternatively, v could be held constant and the current i dropped at the intermediate speeds, or slightly higher power could be achieved by keeping v and i constant.

Figure 3:
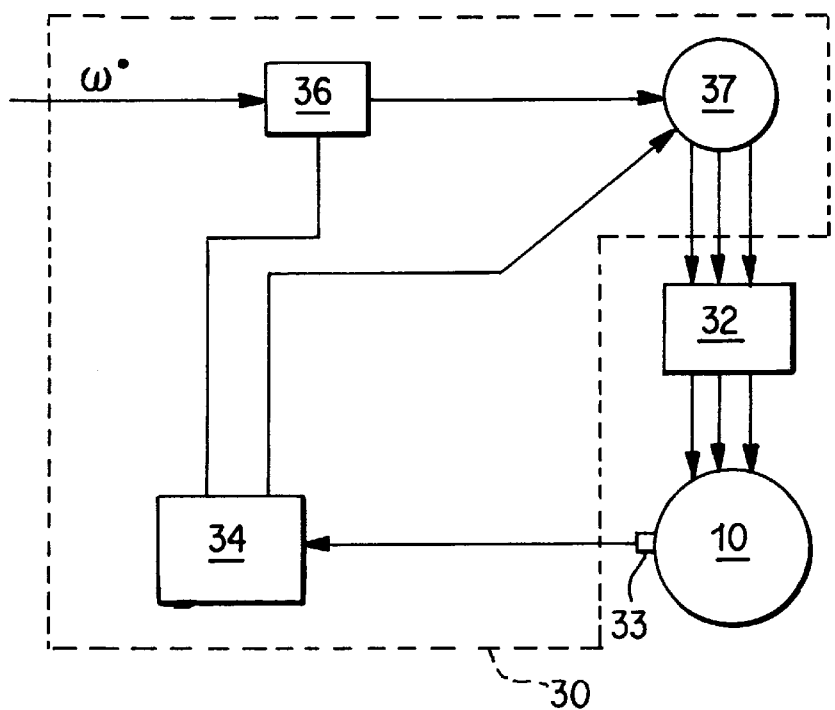
FIG. 3 is a diagramatic illustration of the motor controller.

The motor controller is diagrammatically shown in FIG. 3. The controller comprises the micro-controller 30, the power stage 32, the motor 10 and sensors 33. The sensors 33 comprise three (3) sensors located 120° around the rotor and provide signals to the calculator 34. The calculator determines the speed of the rotor and its position which is compared to the command speed ω in the comparator 36. The comparator 36 includes switching so that a signal can be provided to the controller/inverter 37 whose output is used by the power stage 32 to provide power to the motor at the appropriate phase angle to maintain the power factor close to unity. By monitoring the motor speed and varying the voltage vector in accordance with whether an increase or decrease is required, a substantially constant power through the motor speed range is maintained.

While the motor of this invention has been designed particularly with modem refrigerants in mind, such as the refrigerant R134A, it is also possible to construct the motor to drive a compressor in a system using ammonia as the refrigerant For this purpose the motor windings and any other wiring associated therewith would be formed of non-copper containing metal, preferably silver or aluminium. The magnetic core of the rotor would preferably be sealed so as not to come into contact with the ammonia refrigerant.

The motor of the invention, when used in a refrigeration system, will be cooled by refrigerant circulating through the motor.

What is claimed is:

1. A high speed, brushless, DC motor having a rotor comprising a solid, rare earth magnet core surrounded by a constraining sleeve, and control circuitry including an electronic inverter of a predetermined rating, the control circuitry including means to maintain substantially constant power through the range of motor speeds from a base speed to a maximum speed while maintaining a power factor close to 1, by varying the advance angle of the supplied armature current relative to the back-emf thereby effecting flux-weakening throughout the constant power speed range.

2. A motor according to claim 1 wherein the currents and the power factors at the extremes of the power speed range are designed to be equal, with the current lagging the voltage at the base speed and leading it at the maximum speed.

3. A motor according to claim 2 wherein the design base speed is approximately 32,000 rpm and the design maximum speed is approximately 48,000 rpm and the current advance at maximum power is between about 15° and 20° at the design base speed.

4. A motor according to claim 2 wherein the current lags the voltage at the base speed and leads it at the maximum speed.

5. A motor according to claim 1 wherein the design base speed is approximately 32,000 rpm and the design maximum speed is approximately 48,000 rpm and the current advance at maximum power is between about 15° and 20° at the design base speed.

6. A motor according to claim 5 wherein the current lags the voltage at the base speed and leads it at the maximum speed.

7. A motor according to claim 1, wherein the current lags the voltage at the base speed and leads it at the maximum speed.

* * * * *